UNITED STATES PATENT OFFICE.

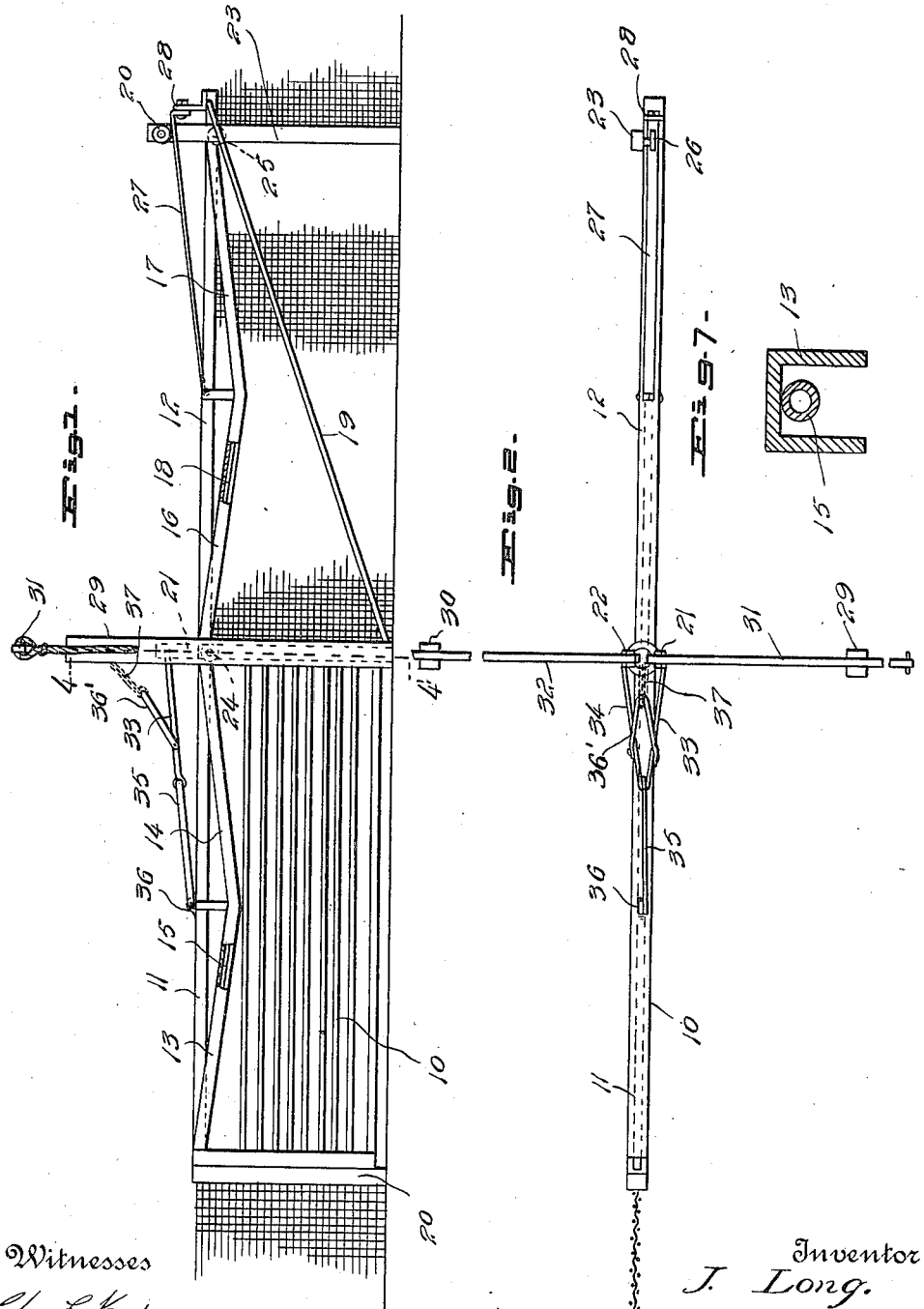

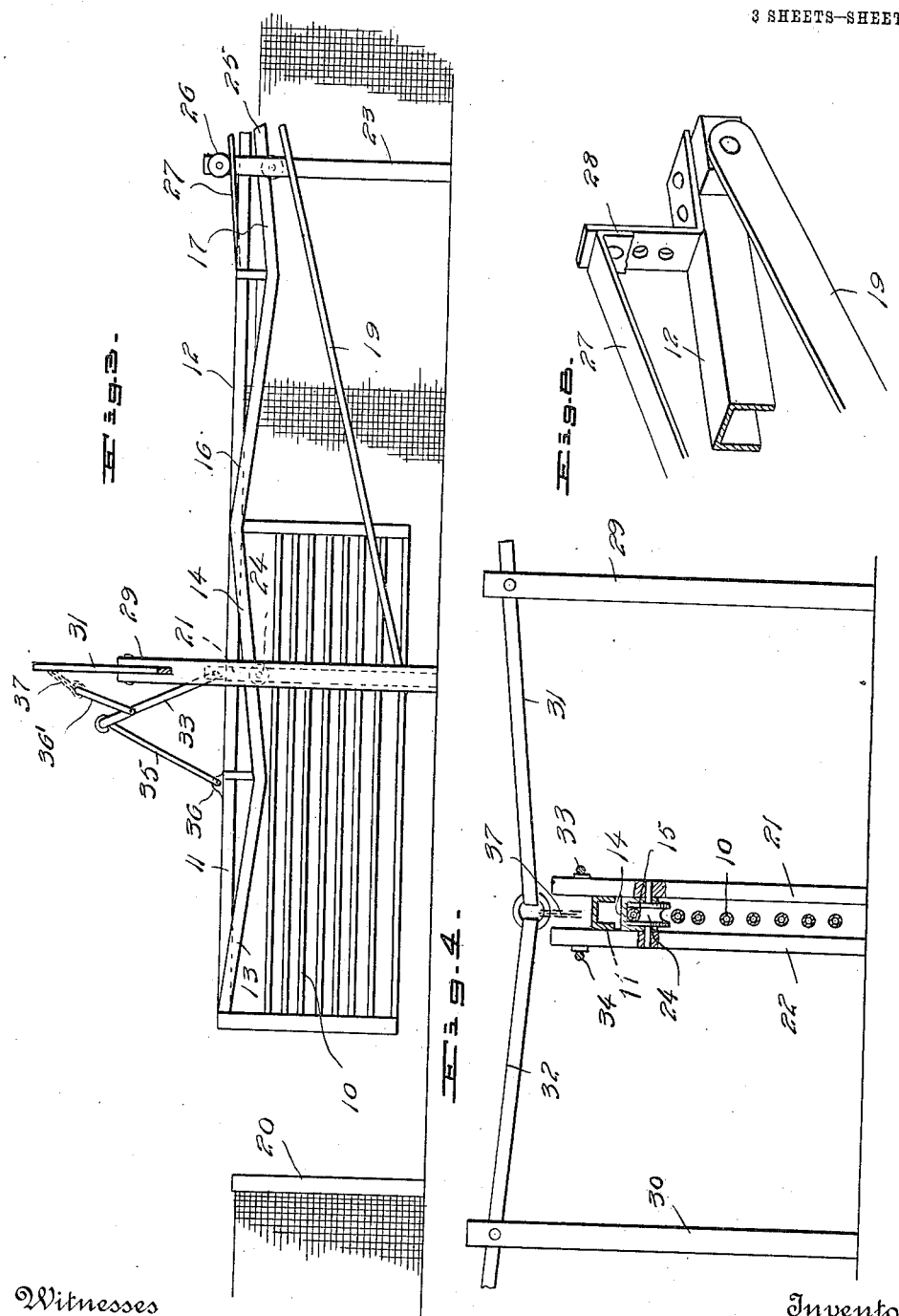

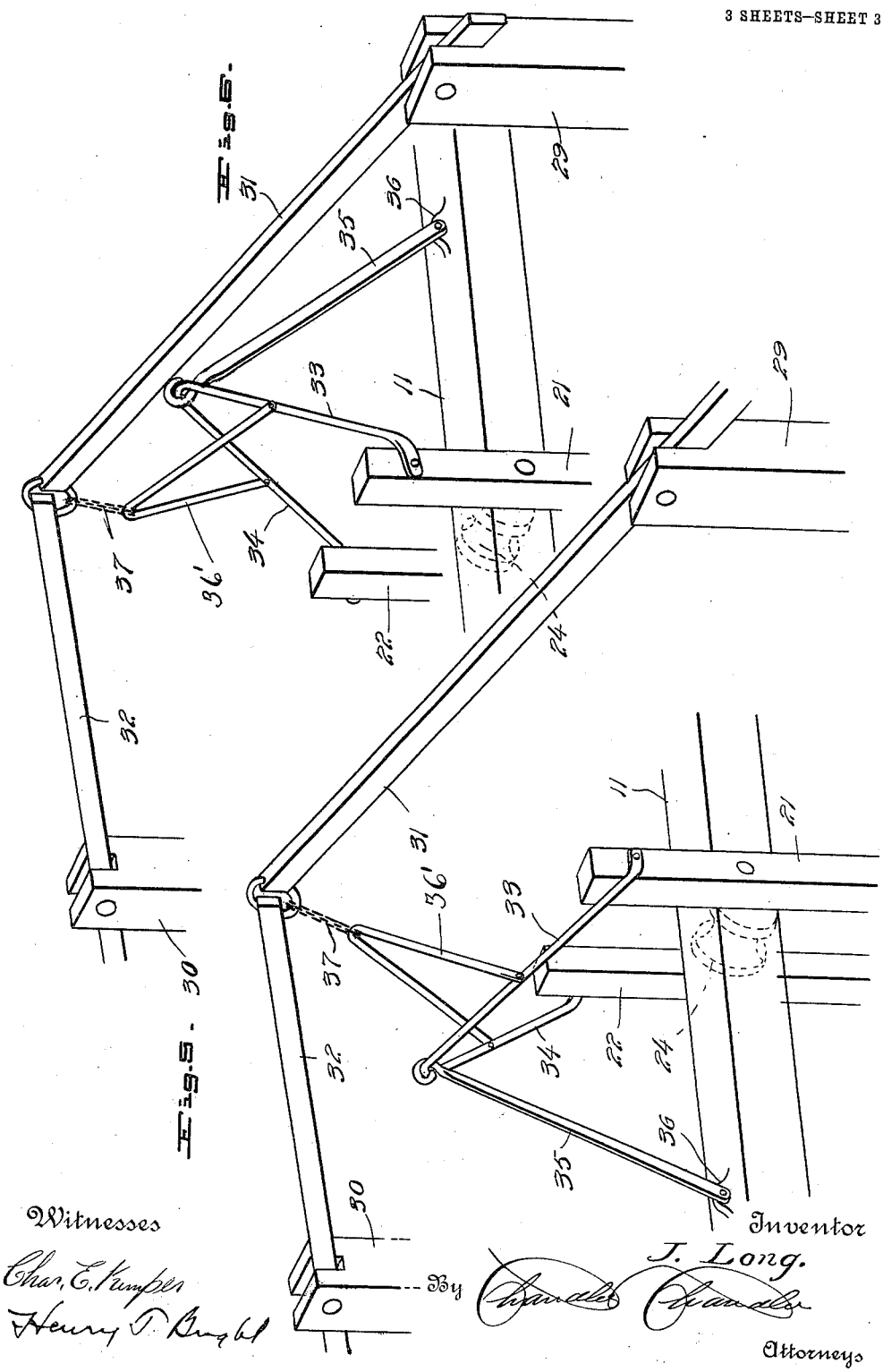

JOHN LONG, OF PANORA, IOWA.

GATE.

1,090,732. Specification of Letters Patent. Patented Mar. 17, 1914.

Application filed May 23, 1913. Serial No. 769,503.

*To all whom it may concern:*

Be it known that I, JOHN LONG, a citizen of the United States, residing at Panora, in the county of Guthrie, State of Iowa, have invented certain new and useful Improvements in Gates; and I do hereby declare the following to be a full, clear, and exact description of the invention, such as will enable others skilled in the art to which it appertains to make and use the same.

This invention relates to gates and particularly to farm gates of the sliding type.

In gates of the type named there is a tendency during the closing movement of the gate for the forward end to drop down and engage the ground so as to interfere with the easy and efficient operation of the gate.

It is therefore one of the objects of this invention to provide improved means for preventing the forward end of the gate from dropping down during closing movement.

A further object of the invention resides in the provision of a gate which will be simple in construction, easily operated, durable and comparatively inexpensive to produce and install.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a view in elevation of a gate constructed in accordance with the invention, same being shown in closed position; Fig. 2, a plan view of what is shown in Fig. 1; Fig. 3, a partial front elevation showing the gate partly open; Fig. 4, a section on the line 4—4 of Fig. 1; Fig. 5, a detail perspective view of the operating mechanism of the gate in the position it would occupy when the gate is partly open; Fig. 6, a view similar to Fig. 5 with the operating mechanism in the position it would occupy when the gate is almost fully open; Fig. 7, an enlarged transverse section through the supporting rail of the gate, and Fig. 8, a detail perspective view showing the mounting of the adjustable rail which supports the forward end of the gate during closing.

Referring to the drawings 10 indicates a sliding gate constructed in the main of tubular pipe and including a top bar 11 which is extended rearwardly as at 12. Secured to the under side of the top bar 11 is a supporting rail formed of channel iron and including angularly disposed sections 13 and 14. Mounted within the channel of the sections 13 and 14 is a cylindrical bearing rod 15. Secured to the under side of the extension 12 of the bar 11 is a supporting rail formed of channel iron and including angularly disposed sections 16 and 17 in the channel of which is mounted a cylindrical bearing rod 18. The extension 12 and the supporting rail formed by the sections 16 and 17 are strengthened by means of a brace 19 extended from the free end of the extension 12 to the adjacent end of the gate 10. The gate structure further includes a latch post 20, a pair of intermediate spaced posts 21 and 22 and a rear post 23, the gate 10 sliding between the posts 21 and 22 during its opening and closing movement as is well known. Journaled between the posts 21 and 22 is a grooved pulley 24 on which the bearing rod 15 travels during the movement of the gate. Rotatably mounted on the post 23 is a grooved pulley 25 on which the bearing rod 18 travels during the movement of the gate. Journaled on the post 23 above the pulley 25 is a pulley 26 which is adapted to be engaged during closing movement of the gate by a rail 27 the inner end of which is hingedly connected to the extension 12 intermediate the ends of said extension, while the outer end of said rail 27 is adjustably connected to the outer end of said extension as at 28. During the closing movement of the gate it will be apparent that the rail 27 will engage the pulley 26 and as a result support the forward end of the gate 10 against any tendency to lower or drop down. This supporting quality of the rail 27 may be varied by adjusting the outer end of said rail.

The operating mechanism of the gate comprises posts 29 and 30 disposed on opposite sides of the gate and having pivoted on their upper ends respectively operating levers 31 and 32. Pivotally connected to the upper ends of the posts 21 and 22 respectively are the arms 33 and 34 of a yoke and this yoke is connected by a link 35 to a bracket 36 mounted centrally on the gate 10. Pivotally connected to the arms 33 and 34 intermediate the ends of said arms are the arms of a yoke 36' and this yoke 36' is connected to the adjacent ends of the levers 31 and 32 by a chain 37.

Referring to Fig. 1 it will be apparent that when the outer end of either of the levers 31 or 32 is moved downwardly the yoke formed by the arms 33 and 34 will move upwardly at its free end and institute the opening movement of the gate. As soon as the junction of the sections 13 and 14 has passed the pulley 24 and the junction of the sections 16 and 17 has passed the pulley 25 the gate will move to full open position under the influence of gravity, the free end of the yoke formed by the arms 33 and 34 moving between the arms of the yoke 36' as will be obvious. To close the gate this operation is repeated.

What I claim is:—

1. The combination of a pair of spaced supporting posts, a guide post, a pulley journaled between the supporting posts, vertically spaced pulleys journaled on said guide posts, a gate slidable between the supporting posts and including a top bar having a rearward extension movable between the pulleys on the guide posts, an angular rail secured to the under side of the top bar of the gate and engaging the pulley between the supporting posts an angular rail secured to the under side of the extension of said top bar, and engaging the lowermost pulley on the guide post, a rail pivoted to the upper side of said bar and adapted to engage the uppermost pulley on the guide post during the closing movement of the gate to support the forward end of the gate against downward movement, means for adjusting the free end of said rail toward and away from said extension, and lever operated means for sliding the gate.

2. The combination of a pair of spaced supporting posts, a guide post, a pulley journaled between the supporting posts, a pulley journaled on the guide post, a gate slidable between the supporting post and including a top bar having a rearward extension, an angular rail secured to the under side of the top bar of the gate, said rail being formed of channel iron and having a bearing rod mounted in the channel thereof and engaging the pulley between the supporting posts, an angular rail secured to the under side of said extension, said last named rail being formed of channel iron and having a bearing rod mounted in the channel thereof and engaging the pulley carried by the guide post, and means for sliding said gate.

In testimony whereof, I affix my signature, in the presence of two witnesses.

JOHN LONG.

Witnesses:
T. J. LYONS,
C. E. FOSTER.

Copies of this patent may be obtained for five cents each, by addressing the "Commissioner of Patents, Washington, D. C."